United States Patent [19]

Nonaka et al.

[11] Patent Number: 5,508,988
[45] Date of Patent: Apr. 16, 1996

[54] METHOD AND APPARATUS FOR REPRODUCING INFORMATION FROM A PARTIALLY RECORDED RECORDING MEDIUM

[75] Inventors: Yoshiya Nonaka; Yoshio Aoyagi; Hiroyuki Abe; Chiaki Hirano; Kiyoshi Furukawa; Alex Bradshaw; Kazuhiro Kiyoura; Seiji Kato; Koichiro Haraguchi, all of Kawagoe, Japan

[73] Assignee: Pioneer Electronic Corporation, Tokyo, Japan

[21] Appl. No.: 357,149

[22] Filed: Dec. 15, 1994

Related U.S. Application Data

[63] Continuation of Ser. No. 7,868, Jan. 22, 1993, abandoned.

[30]   Foreign Application Priority Data

Jan. 24, 1992 [JP] Japan ................................. 4-011440
Jan. 24, 1992 [JP] Japan ................................. 4-011441

[51] Int. Cl.$^6$ ..................................................... G11B 7/00
[52] U.S. Cl. ............................................. 369/58; 369/32
[58] Field of Search ............................. 369/47, 48, 54, 369/58, 30, 32, 33, 50, 44.27, 44.28

[56]   References Cited

U.S. PATENT DOCUMENTS

| | | | |
|---|---|---|---|
| 4,932,016 | 6/1990 | Yoshida et al. | 369/48 |
| 5,003,521 | 3/1991 | Yoshida et al. | 369/54 |
| 5,155,719 | 10/1992 | Masakawa | 369/54 |
| 5,157,646 | 10/1992 | Amemiya et al. | 369/32 |
| 5,177,720 | 1/1993 | Kondo | 369/32 |
| 5,206,850 | 4/1993 | Tezuka et al. | 369/48 |

Primary Examiner—Georgia Y. Epps
Assistant Examiner—P. W. Huber
Attorney, Agent, or Firm—Sughrue, Mion, Zinn, Macpeak & Seas

[57]   ABSTRACT

Method and Apparatus for playing a CD are designed to allow playback of a partially recorded disk of CD-Rs (CD-Recordable) having the DRAW (direct read after write) capability. It is determined if a target disk is a partially recorded CD-R recording medium. When a reverse command to return to a predetermined address of the recording medium to execute playback is input, the absolute time for information being reproduced is detected and it is then determined if the absolute time is within a predetermined actual pause period. When the absolute time is determined to be within the actual pause period, the reverse command is canceled. It is therefore possible to properly operate a servo system within that recording area of the recording medium where information has already been recorded, thereby allowing a return to a predetermined address associated with the reverse command. This prevents the loss of control of the servo system. When the pickup position is in a lead-in area of the partially recorded CD-R recording medium, thus ensuring the proper reading control.

7 Claims, 7 Drawing Sheets

METHOD AND APPARATUS FOR REPRODUCING INFORMATION FROM A PARTIALLY RECORDED RECORDING MEDIUM

This is a Continuation of application Ser. No. 08/007,868 filed Jan. 22, 1193 now abandoned.

BACKGROUND OF THE INVENTION

1. Field of the Invention

The present invention relates to an information reproducing apparatus for playing back a recording medium, such as a CD (Compact Disk), and, more particularly, to a CD player capable of playing back a partially recorded CD-R (CD Recordable) which is of a DRAW (direct read after write) type.

2. Description of Background Information

Figure 1:
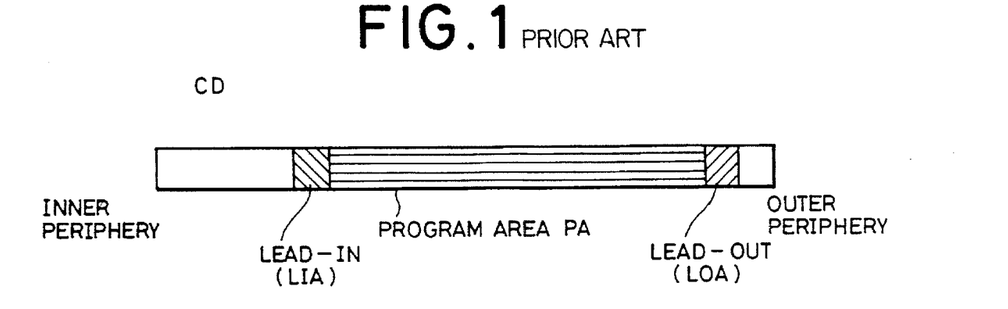
FIG. 1 is a diagram illustrating the information recording state of a CD.

CDs are well known as a recording medium on which audio data or the like is recorded. The CD has a lead-in area where index information of recorded data is recorded, a program area where actual musical data is recorded, and a lead-out area indicating the end of the program area, formed on the CD in order from the inner periphery of the disk, as shown in FIG. 1. A signal to be recorded is a digitally modulated by EFM (Eight to Fourteen Modulation). The signal includes a main code (main information) such as musical data, and a subcode such as a time code (time information). Index information called TOC (Table Of Contents) is recorded in the lead-in area. The signal the total number of pieces of recorded information (e.g., the total number of music pieces), the total program time (e.g., the total playing time), etc. are recorded as the subcode also in that area. Musical information or the like is recorded as the main code in the program area. A track number (TNO) indicating the number of each piece of recorded information (e.g., the music number), the program time (P-TIME) from the beginning of the track, such as the playing time of the music piece, the total program time (A-TIME) measured from the first track number (=1), such as the total playing time, etc. are recorded in the Q channel of the subcode in the program area PA. A lead-out code indicating the lead-out area is recorded in the lead-out area.

Figure 2A:
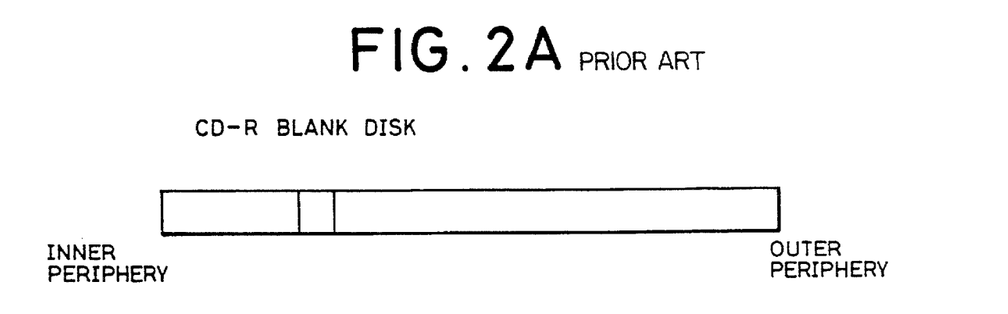
FIGS. 2A through 2C illustrate the information recording states of CD-Rs.
Figure 2B:
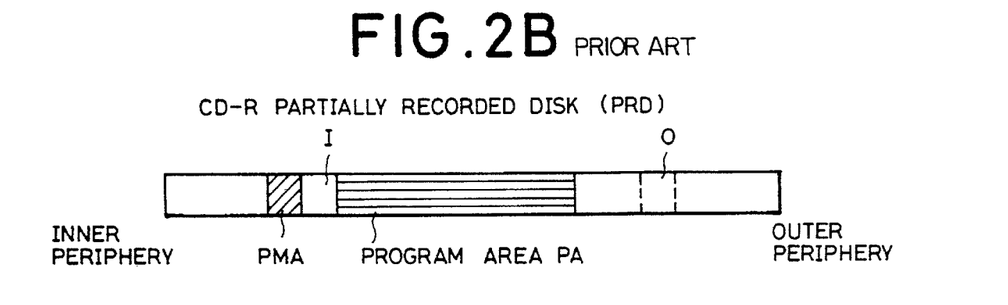
Figure 2C:
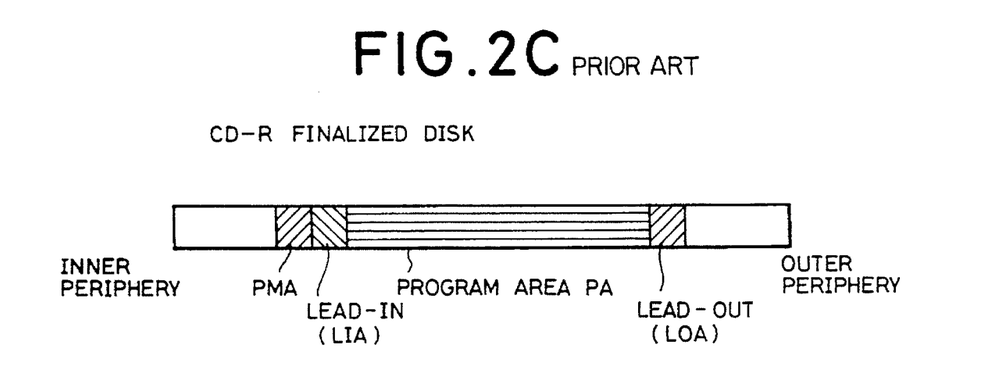

While a CD having the above-described recording format is a read-only recording medium, a writable CD-R having the same format as the CDs has been developed recently. This CD-R recording format standard is standardized into a so-called "Orange Book", which Conforms to the CD format standard (called a "red book"). The CD-R disks are classified into the following three types as shown in FIG. 2A to FIG. 2C depending on the recording status. More specifically, the first type is a blank or unrecorded disk where no information has been recorded, as shown in FIG. 2A. The second type is a partially recorded disk (hereinafter referred to as "PRD") where information is partially written, as shown in FIG. 2B. The last one is a finalized disk for which recording is complete and which has been formatted in substantially the same format as CDs. As illustrated in those diagrams, the lead-in area, program area and lead-out area are also formatted on each CD-R in the same manner as that of CDs.

A pregroove is formed on the recording track of a CD-R, and it is wobbled by a frequency that is acquired through FM modulation of a carrier with data indicating the absolute time information (ATIP: Absolute Time In Pregroove). In a CD-R recording and playback apparatus, the tracking control and spindle control are performed according to the pregroove so that information is recorded on and read from a blank disk as well as a PRD. A PMA (Program Memory Area) as a temporary TOC area to store the recording history of recorded information is provided on the PRD on the inner periphery side of an area I that is reserved for the lead-in area LIA as indicated in FIG. 2B. In this PMA, the following three types of information are recorded. The first information includes the start and end addresses of information recorded in the program area, which are recorded in the same format as TOC information that is recorded in the lead-in area. The second type is disk identification information (optional) which may be 6-digit numeral information to identify a disk as needed. The third type is skip information and skip release information, which are associated with a command to skip the recorded information track by track that indicates a movement, or part of each track indicating a movement (time can be designated in the latter case) at the time of playing back the disk. The reason for recording such information as temporary TOC in the PMA is that since information is writable in the remaining program area on the PRD, TOC information cannot be recorded in the lead-in area LIA until the finalization of recording is instructed.

Prior to Finalization, no information is written in the lead-in area I and the lead-out area 0 of a PRD. Therefore, those areas remain in a mirror-finished state. When a command for finalization is given, the CD-R recording apparatus records predetermined information and TOC information recorded in the PMA as a subcode in the lead-in area I, and records a predetermined lead OUT code indicating the lead-out area LOA in the area 0 for the lead-out area LOA in order to provide the same format as that of CDs at last. This allows the conventional CD player to play back the finalized CD-R.

Figure 3:
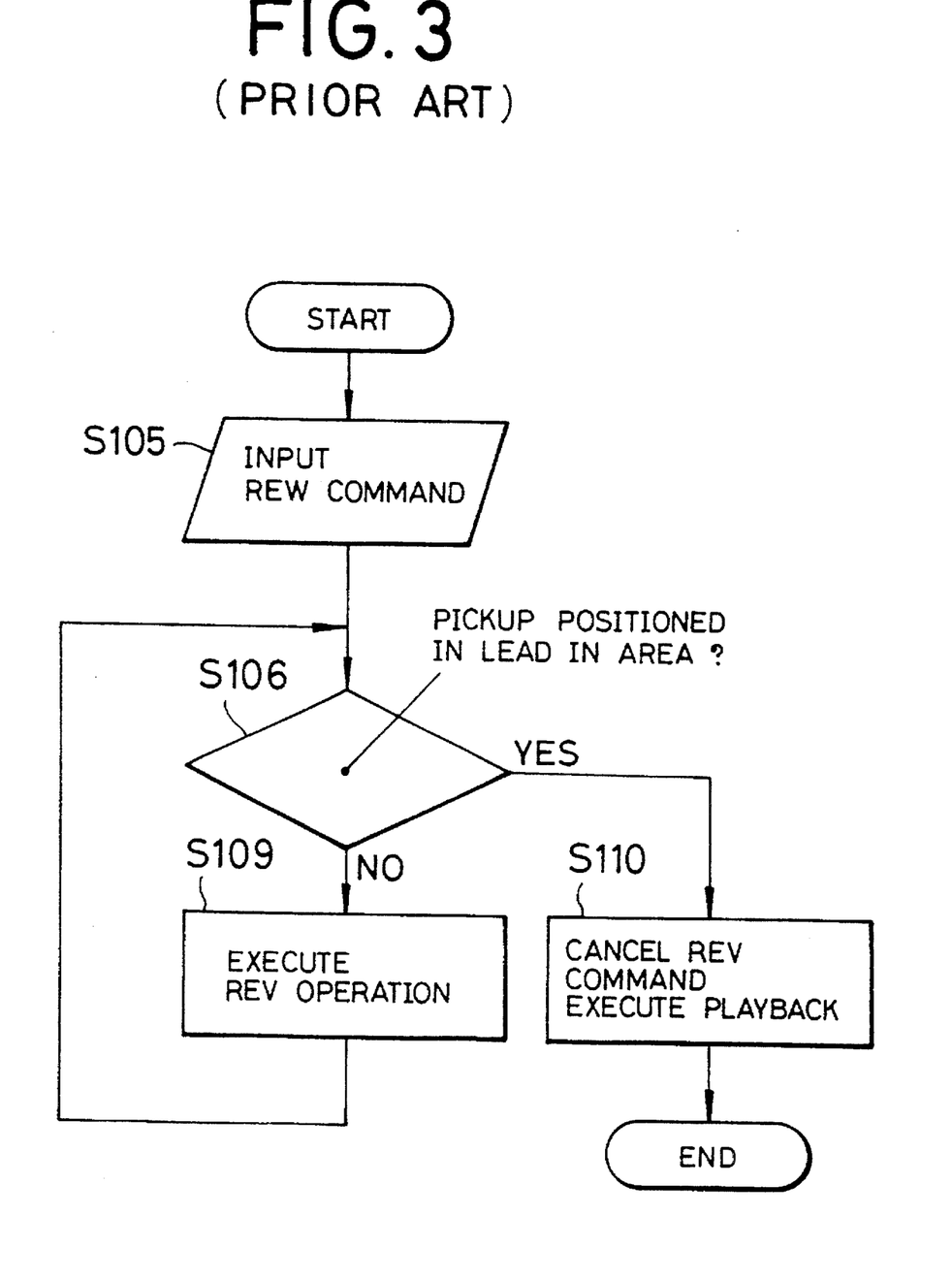
FIG. 3 is a flowchart illustrating a reverse operation in an information reproducing method.

Further, as shown in FIG. 3, when a reverse (REV) command is input during playback of the CD-R to return the pickup to the head address of the program area of the CD-R to start reproduction (step 105), it is checked if the pickup is positioned on the lead-in area (step 106). The decision of step 106 is made by detecting the lead-in area as the inner peripheral edge of the disk. When the pickup position is detected to be on the lead-in area, the reverse command is canceled and playback is carried out (step 110). When the pickup position is detected to be off the lead-in area in step 106, a reverse operation is performed to cause the pickup to sequentially jump back to the head address of the program area (step 109). Those steps 106 and 109 are repeated until the pickup position is detected to be on the lead-in area.

The conventional CD player cannot reproduce reproducible information from a PRD though that information is stored in the program area PA because of the following reasons. Although a PRD has TOC information recorded in the PMA provided on the inner periphery side of the lead-in area, the conventional CD player is equipped with no mechanism to access that PMA. In addition, the area I for the lead-in area LIA and the area 0 for the lead-out area LOA remain mirror-finished and the conventional CD player is not designed to perform the proper control on information reading from such areas so that loss of control of the servo system may occur when reading information from those areas. Even if the setup is properly done for a PRD, the conventional CD player cannot properly control information reading from the PRD. A reverse command to return the pickup to a predetermined address on the PRD for playback moves the pickup over to the mirror-finished lead-in area, and causes loss of control of the servo system.

To solve this problem the CD player may be equipped as a CD-R recording and playback apparatus with the mechanism to access the PMA and some means to read the pregroove and perform the tracking and spindle controls. Providing a special device only for the PRD is not cost effective.

SUMMARY OF THE INVENTION

It is therefore an object of the present invention to provide an information reproducing method and apparatus, which can reproduce recorded information from a partially recorded recording medium without any additional mechanical means, and can execute the proper information reading control, particularly in response to a reverse command.

To achieve this object, according to the present invention, an information reproducing method and an apparatus for playing back a recording medium having a recording area where information is additionally written piece by piece determine if the recording medium to be played back is a partially recorded recording medium where information is additionally written in part of the recording area, detect an absolute time of the recording medium based on that information being reproduced therefrom at a time a reverse command to return to a predetermined address of the recording medium to execute playback is input, and determine if the absolute time is within a predetermined actual pause time, when the reverse command is input while playing back the partially written recording area of the partially recorded recording medium, and, stop movement to the predetermined address of the recording area, carried out in response to the reverse command, and cancel the reverse command, when the absolute time is determined to be within the actual pause time.

According to this invention, it is determined if the recording medium being played is a partially recorded recording medium; when a reverse command to return to a predetermined address of the recording medium to execute playback is input, the absolute time for information being reproduced is detected and it is then determined if the absolute time is within a predetermined actual pause time; and when the absolute time is determined to be within the actual pause time, the reverse command is canceled. It is therefore possible to properly operate a servo system within that recording area of the recording medium where information has already been recorded, thereby allowing a return to a predetermined address associated with the reverse command. This prevents loss of control of the servo system from occurring due to a pickup position is in a lead-in area of the partially recorded recording medium, thus ensuring the proper reading control.

DETAILED DESCRIPTION OF THE PREFERRED EMBODIMENT

Figure 4:
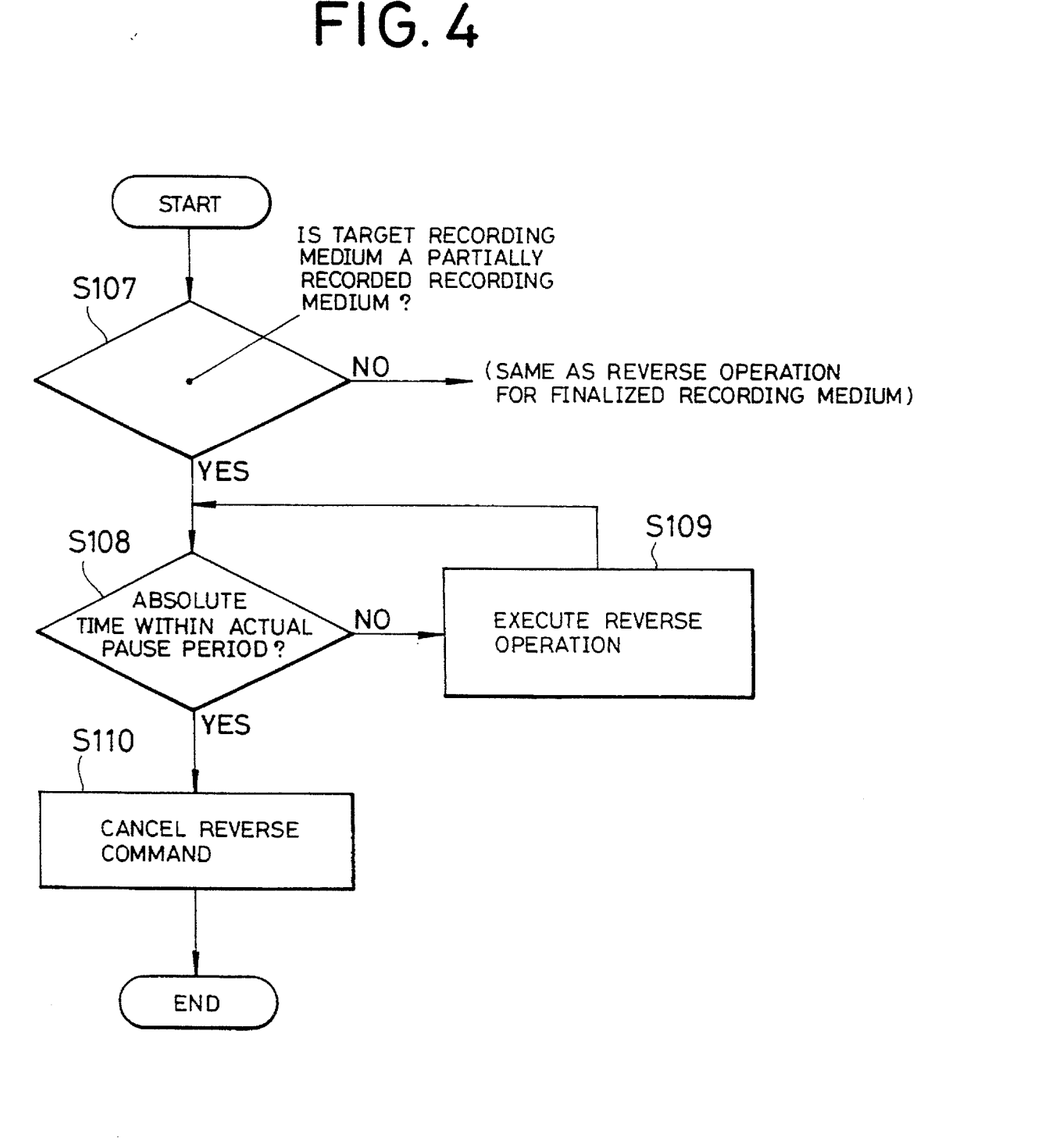
FIG. 4 is a diagram for explaining the principle of an information reproducing method embodying the present invention.

Before going into a detailed description of a preferred embodiment of the present invention, the principle of an information reproducing method embodying the present invention will be explained referring to FIG. 4. In FIG. 4, the same step numbers as used in the flowchart in FIG. 3 are used to indicate corresponding steps. First it is determined in step 107 if the recording medium is a partially recorded recording medium where information is written in part of the recording area. In the next step 108, when a reverse command to return to a predetermined address of the recording medium to execute playback is input while playing back the partially written recording area of the partially recorded recording medium, the absolute time of the recording medium is detected based on that information which is being reproduced therefrom at the time the reverse command is input, and it is then determined if the absolute time is within a predetermined actual pause time. When the absolute time is determined to be within the actual pause time, the movement to the predetermined address of the recording area, carried out in response to the reverse command, is stopped and the reverse command is canceled in step 110.

Figure 5:
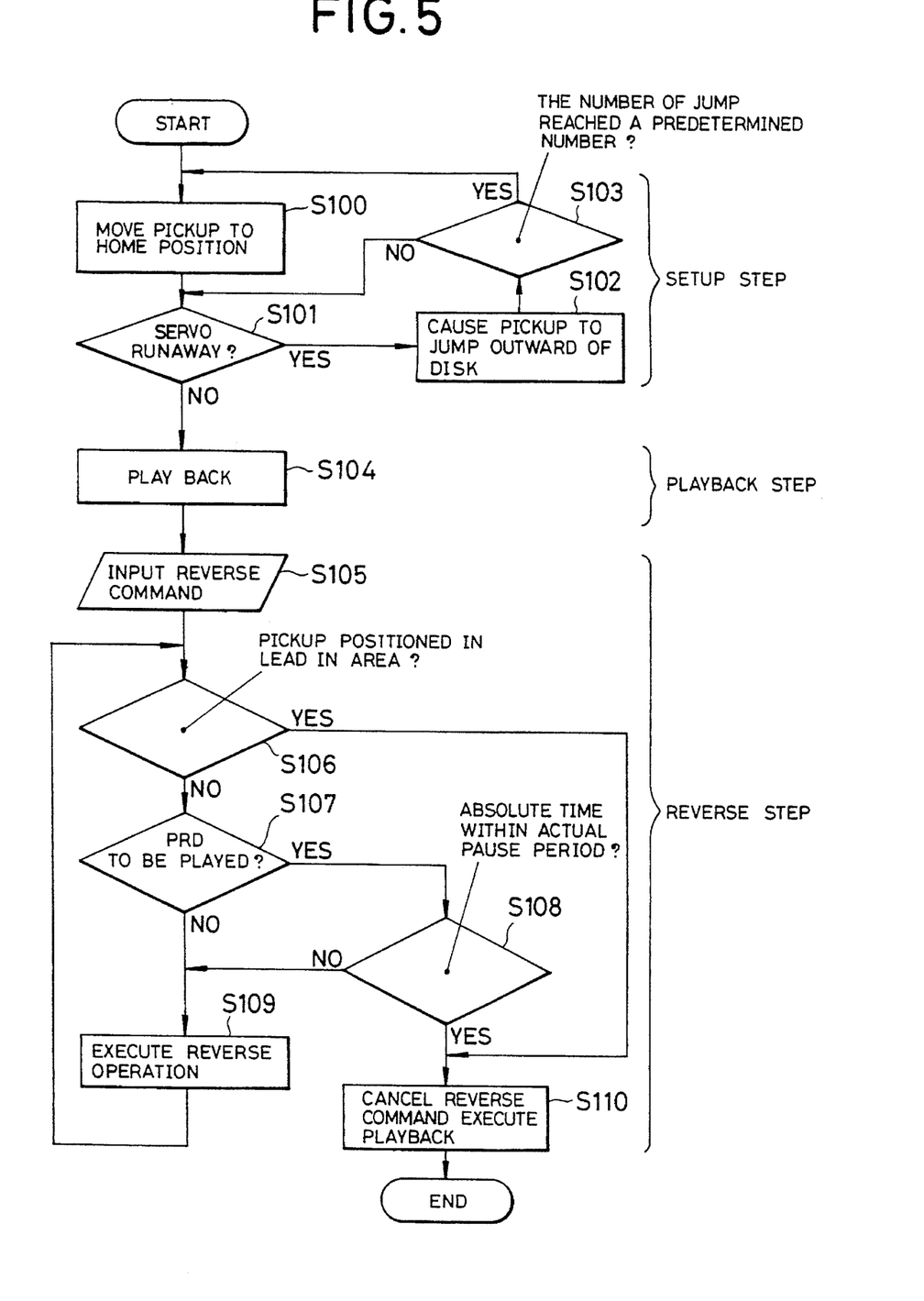
FIG. 5 presents an operational flowchart of an information reproducing method according to one embodiment of the present invention.

One embodiment of the present invention will be described with reference to FIGS. 5 through 7. FIG. 5 presents a general operational flowchart of the method according to this embodiment, FIG. 6 an operational timing chart for this method, and FIG. 7 a block diagram showing the basic structure of a CD player that executes this method.

It is apparent from those diagrams that the information reproducing method according this embodiment comprises a setup step for moving a pickup 2 to the home position of a disk D, a playback step after this setup is complete, and a reverse step for returning the pickup 2 to the head address of the program area of the disk D during playback. This method is characterized particularly by the improvement on the reverse step.

In the reverse step in this embodiment, with a reverse command input (step 105), when the pickup 2 is determined to be positioned off the lead-in area (step 106) and the disk D being played is determined to be a PRD (step 107), the absolute time in that portion of the program area of the disk D where the pickup 2 is positioned is detected, and it is determined if the absolute time is within a predetermined actual pause time (step 108). Based on the decision, canceling of the reverse command (step 110) or execution of the reverse operation (step 109) is controllably selected.

A description will now be given of the operation in the case where the CD player shown in FIG. 7 plays back the disk D of a PRD type.

The illustrated CD player comprises a spindle motor 1, the pickup 2, a servo mechanism 3, an APC (Automatic Phase Controller) 4, a servo unit 5, a preamplifier section 6, a decoder unit 7, a D/A converter section 8, a display/operation section 9, and a system controller 10. The system controller 10 includes a microprocessor and memory (ROM, RAM). This system controller 10 discriminates the type of a disk in use and the position of the pickup 2 and supplies various control signals to the servo unit 5, based on various commands supplied from the display/operation section 9, signal control data supplied from a control-data decoder of the decoder unit 7 and signals supplied from tracking servo, focus servo, carriage servo and spindle servo sections in the servo unit 5.

As shown in FIG. 5, when the disk D (PRD) is placed in the CD player and a setup switch in the display/operation section 9 is set on, a setup process is executed. In this setup process, the servo unit 5 moves the pickup 2 to the home position of the disk D in response to an instruction from the system controller 10 (step 100), and it is then determined if the moved pickup 2 has caused a loss of control in the servo system (step 101). When the pickup 2 is determined to be in the state of loss of control in step 101, the pickup 2 is allowed to jump over a predetermined number of tracks outward of the disk D (step 102). When the number of jumps of the pickup 2 is determined to be less than a predetermined value (step 103), it is checked again if the pickup 2 is in the state of loss of control (step 101). If the number of jumps of the pickup 2 is determined to have reached the predetermined value in step 103, the flow returns to step 100 to initiate the movement of the pickup 2 to the home position. Those steps 100, 101, 102 and 103 are repeated until no loss of control of the servo system occurs in the setup state.

When no loss of control of the servo system is detected in step 101 and the setup process is complete, the flow goes to a playback process to carry out a reproduction operation (step 104). In the reproduction operation, the servo mechanism 3 controls the pickup 2 to output an RF signal therefrom under the control of the system controller 10. This RF signal is output as an audio signal via the preamplifier section 6, decoder unit 7 and D/A converter section 8. This output of the audio signal is done in such a way that the first movement to the third movement recorded in the program area as shown in FIG. 6 are output in order.

Figure 6:
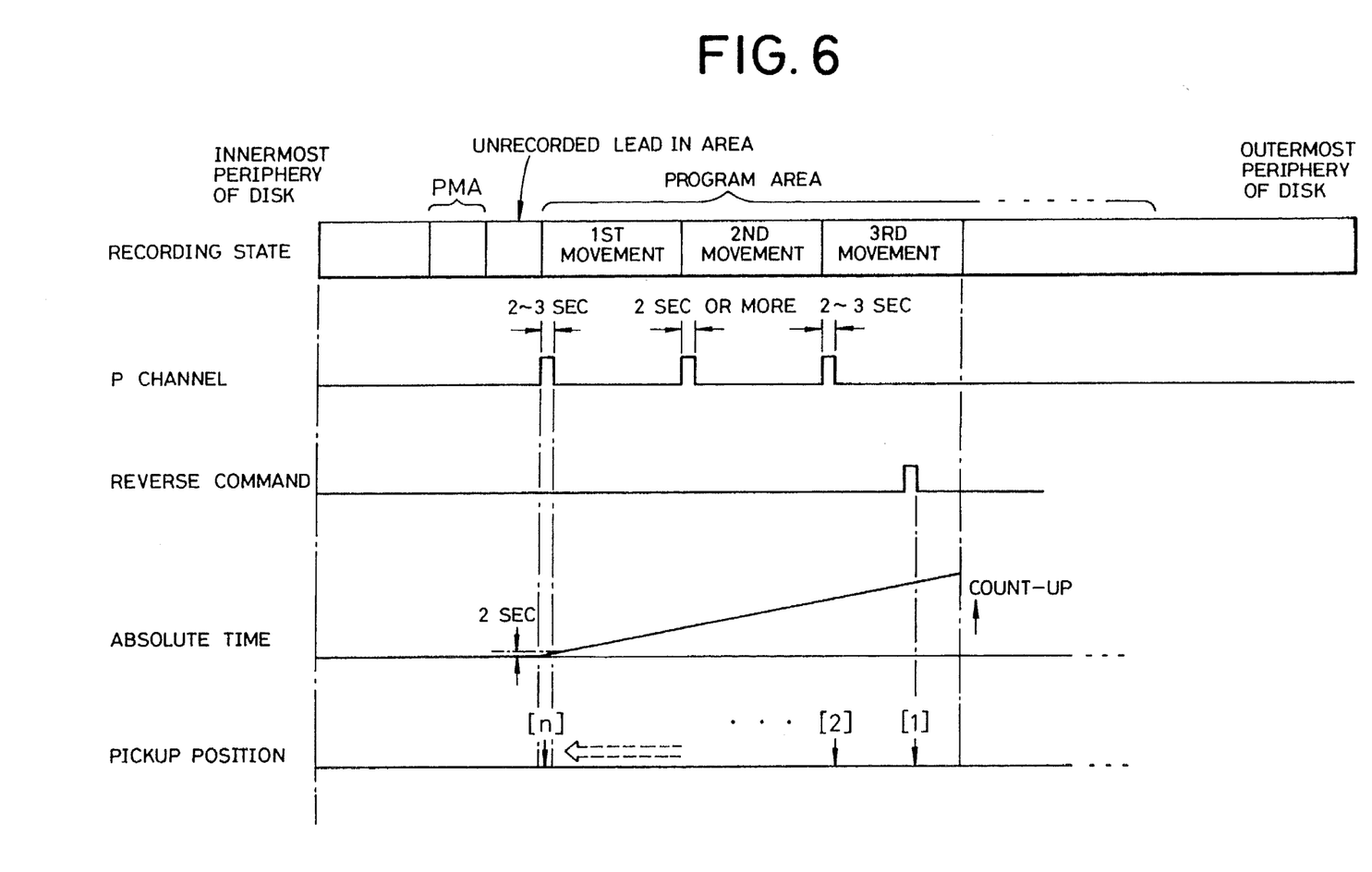
FIG. 6 presents an operational timing chart for the method of this embodiment.
Figure 7:
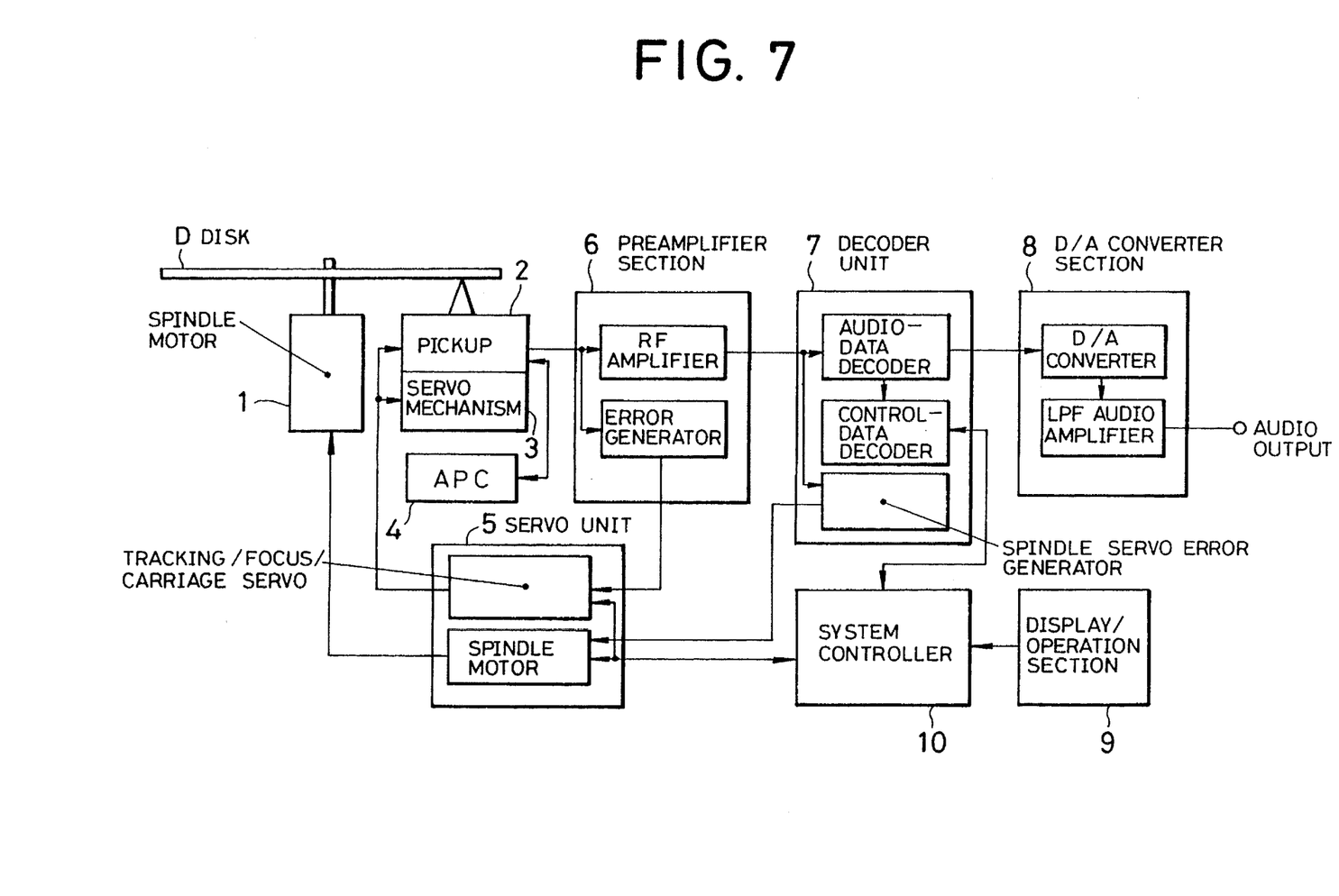
FIG. 7 is a block diagram showing the basic structure of a CD player that executes the method of this embodiment.

When a reverse command is input during playback of the third movement, as shown in FIG. 6, (step 105), the CD player enters the reverse step. In this reverse step, it is determined if the position of the pickup 2 (track position [1]; see FIG. 6) on the disk D is in the lead-in area (step 106). When the pickup 2 is detected as being positioned in the lead-in area, the reverse command is canceled and playback is executed (step 110).

When the pickup 2 is detected as positioned off the lead-in area in step 106, a check is made to determine whether or not the disk D being played is a PRD (step 107). If the disk D is not discriminated as a PRD, the reverse operation is executed to allow the pickup 2 to jump over a predetermined number of tracks inward of the disk D (step 109). The sequence of processes from steps 106, 107 and 109 is repeated until the position of the pickup 2 after the reverse movement is discriminated to be in the lead-in area in step 106.

When the disk D is determined to be a PRD in step 107, the system controller 10 detects the absolute time (see the count-up state in FIG. 6) in the track on the disk D which the pickup 2 is currently accessing, based on the output of the decoder unit 7, and then determines if the detected absolute time falls within an actual pause time (00'00" to 00'02") (step 108). When the absolute time is determined as falling in the actual pause time, the reverse operation is terminated and playback is executed (step 110).

When the absolute time is determined as falling outside the actual pause time in step 108, the flow advances to the aforementioned step 109 (the reverse operation) to allow the pickup 2 to make sequential jumps (see [2] . . . [n] in FIG. 6). The movement of the pickup 2 is repeated until the absolute time is determined as falling within the actual pause time in step 108.

Figure 8:
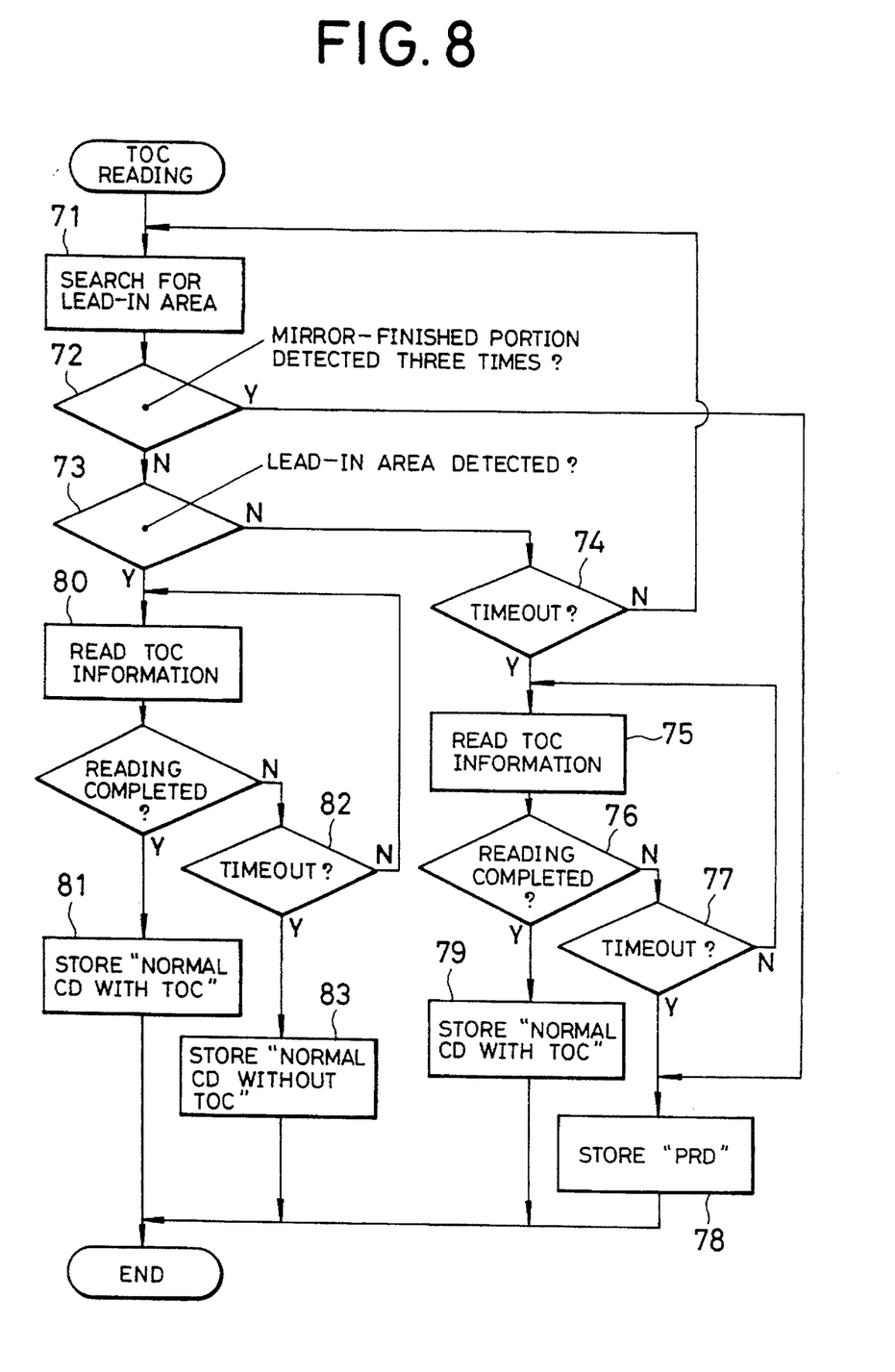
FIG. 8 is a flowchart showing an example of the method for determining a PRD.

FIG. 8's flowchart exemplifies method for determining a PRD performed at step 107

First, the system controller 10 search for the lead-in area (step 71). If the reproduced disk is a PRD, the lead-in area is mirror-finished so that the pickup 2 moves on the mirror-finished portion and no servo is enabled, causing a loss of control of the servo system. At this time, when detecting the runaway of the servo system, the system controller 10 stops the spindle motor 1 and executes the setup operation to search for the lead-in area again. In this embodiment, when searching for the lead-in area results in losing control of the servo system three times, the lead-in area is determined to be mirror-finished and the disk is a PRD, and "PRD" is stored as the disk discrimination information (step 72). In this case, the lead-in area is considered as mirror-finished when the control loss of the servo system occurs three times in the process of detecting the mirror-finished portion. But as the criterion number of the control loss is determined in consideration of scratches or vibration of the disk, any number can be selected as long as the mirror-finished state is surely detected.

Even if the reproduced disk 1 is a PRD having a mirror-finished lead-in area, when the tracking control of the pickup 2 uses three spot beams, the pickup 2 does not move to the mirror-finished portion, causing no control loss of the servo system. But the lead-in area cannot be searched in this case as well, so that timeout occurs. Further, even with a normal CD, if the lead-in area cannot be detected due to scratches or the like on the CD, timeout also occurs (steps 73 and 74). When the lead-in area cannot be detected and timeout occurs, TOC information is then read (step 75). If the disk is a PRD, the TOC information cannot be read as a matter of course, causing timeout. In this case, therefore, the disk is discriminated as a PRD and "PRD" is stored as the disk discrimination information (steps 76, 77 and 78). When reading the TOC information is possible and is completed, the disk is discriminated as a normal CD from which the TOC information can be read, and "normal CD with TOC" is stored as the disk discrimination information (step 79).

When the lead-in area is detected in step 73, the routine goes to a process of reading TOC information as done in the prior art. If the reading is completed, the disk is discriminated as a "normal CD with TOC", or if the reading cannot be accomplished before the time is out, the disk is discriminated as a "normal CD without TOC", and the discrimination result is stored as the disk discrimination information in each case (steps 80, 81, 82 and 83).

Table 1 below shows the correlation between the conditions and the results of the disk discrimination.

As shown in Table 1, in this embodiment, when a normal CD is detected and the lead-in area is detected as mirror-finished, or the lead-in area cannot be detected and TOC information cannot be read, the reproduced disk is discriminated as a PRD and also the discrimination result is stored accordingly.

TABLE 1

| | Lead-in Area | TOC Reading | Results |
| --- | --- | --- | --- |
| (1) | detected | readable | normal CD with TOC |

TABLE 1-continued

| | Lead-in Area | TOC Reading | Results |
|---|---|---|---|
| (2) | detected | timeout | normal CD without TOC |
| (3) | timeout | readable | normal CD with TOC |
| (4) | timeout | timeout | PRD |
| (5) | mirror-finished portion detected | — | PRD |

It is apparent that the above description is one example of the method for discriminating a PRD, and any alternative method can also be employed at step 107 in the embodiment of the invention.

In the foregoing, an embodiment of the present invention has been described. In short, according to this invention, it is determined if a target disk is a partially recorded recording medium; when a reverse command to return to a predetermined address of the recording medium to execute playback is input, the absolute time for information being reproduced is detected and it is then determined if the absolute time is within a predetermined actual pause time; and when the absolute time is determined to be within the actual pause time, the reverse command is canceled. It is therefore possible to properly operate a servo system within that recording area of the recording medium where information has already been recorded, thereby allowing a return to a predetermined address associated with the reverse command. This prevents the loss of control of the servo system from occurring due to a pickup position is in a lead-in area of the partially recorded recording medium, thus ensuring the proper reading control.

What is claimed is:

1. An information reproducing method for playing back a recording medium having a recording area where information is written consecutively, comprising:

a reproduction step for reproducing information recorded on said recording medium;

a command generating step for generating a reverse command; and a reverse step for performing, during execution of said reproduction step, a reversing operation followed by a reproduction of recorded information from a predetermined address of said recording medium in response to said reverse command, to return to said predetermined address of said recording medium for executing playback, said reverse step comprising the steps of:

detecting said reverse command;

determining if said recording medium to be played back is a partially recorded recording medium where information is written in part of said recording area to form a partially written recording area;

detecting an absolute time of said partially recorded recording medium based on information being reproduced from said recording medium at a time when said reverse command is input, and determining if said absolute time is within a predetermined actual pause period as provided at a head position of a recorded part of said recording area, when said reverse command is input while playing back said partially written recording area of said partially recorded recording medium; and stopping movement to said predetermined address of said recording area, carried out in response to said reverse command, and canceling said reverse command, when said absolute time is determined to be within said actual pause period.

2. An information reproducing method as claimed in claim 1, further comprising a set-up step for moving an information reading position to a home position on said recording medium subsequent to a loading of said recording medium.

3. An information reproducing apparatus for playing back a recording medium having a recording area where information is written consecutively, comprising:

playing means for reproducing information recorded on said recording area of said recording medium;

command generating means for generating commands for reproduction operations of said playing means including a reverse command for causing reverse movement to a predetermined address of said recording medium; and control means, connected to said playing means and said command generating means, for controlling reproduction operations of said playing means, said control means comprising:

means for detecting said reverse command;

means for determining if said recording medium to be played back is a partially recorded recording medium where information is written in part on said recording area to form a partially written recording area;

means for detecting an absolute time of said partially recorded recording medium based on information being reproduced from said partially recorded recording medium at a time said reverse command is input from said command generating means, and determining if said absolute time is within a predetermined actual pause period as provided at a head position of a recorded part of said recording area, when said reverse command is input while playing back said partially written recording area of said partially recorded recording medium; and means for stopping movement to said predetermined address of said recording area, carried out in response to said reverse command, and canceling said reverse command, when said absolute time is determined to be within said actual pause period.

4. A reproducing apparatus as claimed in claim 3, wherein said control means further comprises set-up means for performing a set-up operation by which an information reading position of said playing means to a home position on said recording medium subsequent to a loading of said recording medium into said reproducing apparatus.

5. In an information reproducing method for playing back a recording medium having a recording area where information is written consecutively and where a command generating step generates a reverse command to return to a predetermined address of said recording medium to execute playback, the improvement comprising the steps of:

detecting said reverse command; determining if said recording medium to be played back is a partially recorded recording medium where information is written in part on said recording area to form a partially written recording area;

detecting an absolute time of said partially recorded recording medium based on that information being reproduced from said recording medium at a time of said reverse command, and determining if said absolute time is within a predetermined actual pause period as provided at a head position of a recorded part of said recording area, when said reverse command is input while playing back said partially written recording area of said partially recorded recording medium; and stopping movement to said predetermined address of said recording area, carried out in response to said reverse command, and canceling said reverse command, when said absolute time is determined to be within said actual pause period.

6. In an information reproducing apparatus for playing back a recording medium having a recording area where information is written consecutively and a means for inputting a reverse command return to a predetermined address of said recording medium, the improvement comprising:

means for detecting said reverse command;

means for determining if said recording medium to be played back is a partially recorded recording medium where information is written in part on said recording area to form a partially written recording area;

means for detecting an absolute time of said partially recorded recording medium based on information being reproduced from said recording medium at a time of said reverse command, and determining if said absolute time is within a predetermined actual pause period as provided at a head position of a recorded part of said recording area, when said reverse command is input while playing back said partially written recording area of said partially recorded recording medium; and means for stopping movement to said predetermined address of said recording area, carried out in response to said reverse command, and canceling said reverse command, when said absolute time is determined to be within said actual pause period.

7. An information reproducing method for playing back a recording medium as in claim 1, wherein said partially recorded recording medium comprises a lead-in area and a lead-out area which contain no information so that said lead-in area and said lead-out area remain mirror-finished.

* * * * *